United States Patent [19]
Sahm

[11] Patent Number: 5,720,089
[45] Date of Patent: Feb. 24, 1998

[54] TOOL TURRET WITH CARRIER PLATE

[75] Inventor: Detlef Dieter Sahm, Reichenbach, Germany

[73] Assignee: Sauter Feinmechanik GmbH, Metzingen, Germany

[21] Appl. No.: 637,217

[22] Filed: Apr. 24, 1996

[30] Foreign Application Priority Data

May 9, 1995 [DE] Germany .............. 295 07 674 U

[51] Int. Cl.⁶ .............................................. B23B 29/32
[52] U.S. Cl. .............................. 29/39; 29/43; 82/121; 82/136; 82/153
[58] Field of Search .................... 29/40, 44, 46, 29/47, 43, 39, 41, 45; 82/121, 153, 154, 136, 141

[56] References Cited

U.S. PATENT DOCUMENTS 2,345,613  4/1944  Lukis ...................... 82/153

FOREIGN PATENT DOCUMENTS 3702424  8/1988  Germany.
3930221  4/1991  Germany.

*Primary Examiner*—Steven C. Bishop
*Attorney, Agent, or Firm*—Roylance, Abrams, Berdo & Goodman, L.L.P.

[57] ABSTRACT

A tool turret for machine tools has a turret housing and a turret head rotatably mounted in the turret housing about a rotary axis and lockable in selected angular settings relative to the turret housing. A carriage supports the turret housing and guides movement of the turret housing relative to a machine tool support in a Y direction transverse to the rotary axis. A carriage guide is on the tool support for guiding movement of the carriage. A carrier plate is part of the carriage, and extends in a plane defined by the Y direction and an X direction or a Z direction.

22 Claims, 4 Drawing Sheets

TOOL TURRET WITH CARRIER PLATE

FIELD OF THE INVENTION

The present invention relates to a tool turret for machine tools, having a turret head rotatably mounted in a turret housing and lockable in the turret housing in selectable angular positions. The turret head receives and holds tools or tool holders. A carriage supports the turret housing for guided movement relative to the part of the machine tool supporting the turret housing in a direction transverse to the turret head rotary axis.

BACKGROUND OF THE INVENTION

In known machine tool turrets, as disclosed in German Patent No. 37 02 424 C2 and German Patent No. 39 30 221 C2, conventional turret housings cannot be used without modification.

SUMMARY OF THE INVENTION

Objects of the present invention are to provide a tool turret which permits use of a traditional or conventional turret housing without requiring that the turret housing be modified.

The foregoing objects are basically obtained by a tool turret for machine tools, comprising a machine tool support, a turret housing, and a turret head rotatably mounted in the turret housing about a rotary axis and lockable in selected angular setting relative to the turret housing. Tool means on the turret head attaches tools to the turret head. A carriage supports the turret housing and guides movement of the turret housing relative to the machine tool support in a Y direction transverse to the rotary axis. A carriage guide is on the tool support for guiding movement of the carriage. Carriage adjustment means is coupled to the carriage. A carrier plate is part of the carriage, extends in a plane defined by the Y direction and one of an X direction and a Z direction, and is located between the turret housing and the carriage guide.

Because the turret housing can be mounted on the side of the carrier plate, turned away from the carriage guide, the turret housing need not be modified. The turret housing can be fastened to the carrier plate by means of screws, the same as on a cross slide.

Preferably, the turret housing is mounted on the carrier plate with the rotary axis of the turret head extending in the X direction.

In one preferred embodiment, the carrier plate includes a base plate connectable with the machine tool and two side walls extending vertically perpendicular to this base plate. The carriage guide is provided on the base plate. Thus, the carriage guide can be a prebiased roller guide. At some distance above the base plate, a mounting plate is preferably connected with the side walls or configured in one piece with them. The mounting plate can carry a bearing for a spindle. At some distance from the bearing, an electromotor can drive the spindle between two profiled rods forming the carriage guide.

The spindle is preferably axially nonslidable or fixed in the area of its top end, is mounted in the bearing supported by the carrier plate, and is supported rotatably in a second bearing in the area of its bottom end.

An AC servomotor can advantageously be used as drive motor for the spindle. However, the spindle can also be driven by means of a toothed endless belt.

Preferably, the spindle nut, connected securely with the carriage and adapted for adjustment in both directions, has an end position cushioning arrangement for both directions. The drive can then be switched off in the end position by means of simple limit switches. In one preferred embodiment, two plate spring assemblies arranged coaxial to the spindle are used effectively for both adjustment directions as the end position cushionings, and are arranged opposite each other in the spindle nut.

Reinforcement, as required, can be attained by reinforcement plates.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
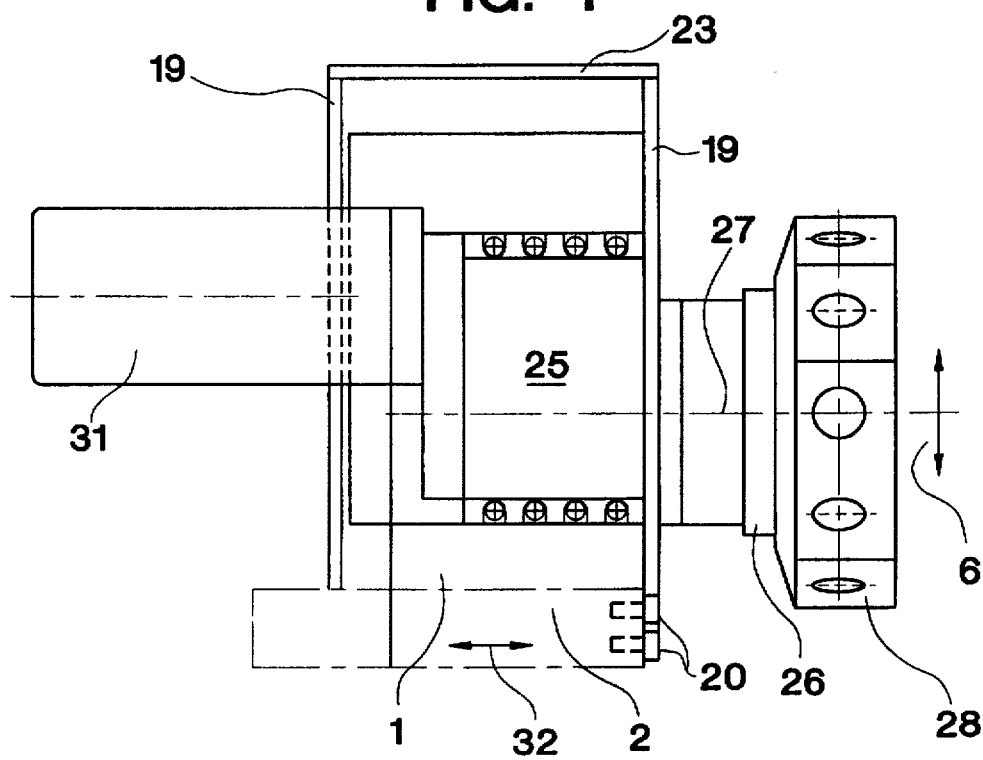
FIG. 1 is a side elevational view of a tool turret according to the present invention.

A tool turret for machine tools, when it is arranged on a cross slide, is movable in the directions of the X axis 32, of the Z axis 33 and of the Y axis 6. The X and Z axes also can be transposed. The tool turret has a carrier with a base plate 1 arranged on a support 2 of the machine tool, and can be connected with the machine tool support by means of screws 3. Side walls 4 are connected with base plate 1, and extend vertically perpendicular to base plate 1 and parallel to and at some distance from one another. One profiled rod 5 is securely attached to each side wall. The profiled rods 5 together form a carriage guide or carriage guideway, providing a prebiased roller guide in the direction of the Y axis 6.

A carriage is guided longitudinally slidably in this carriage guide. The carriage has four guide elements 7 cooperating with carriage guideway 5, and a flat carrier plate 8 (see FIG. 4). One side of the carrier plate engages guide elements 7 which are secured by means of screws. The carrier plate moves with turret housing 25 in the Y direction (i.e., up and down) and extends in a vertical plane.

Figure 4:
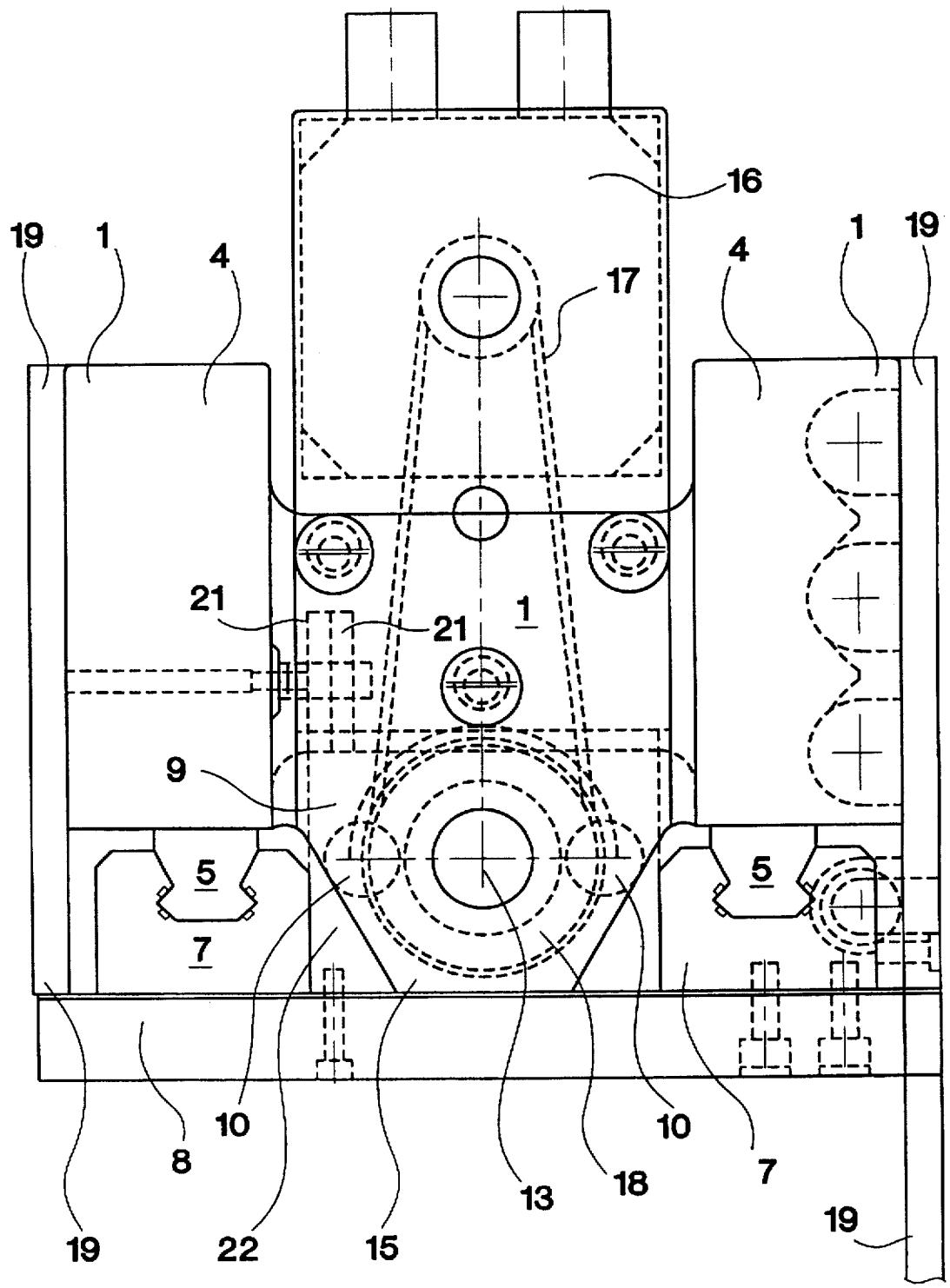
FIG. 4 is an enlarged top plan view of a portion of the tool turret of FIG. 1 with the cover plate removed.

A spindle nut 9 is securely attached to carrier plate 8. Nut 9 engages on the same side of the carrier plate 8 as guide elements 7 and in the middle of the carrier plate between guide elements 7. The longitudinal axis of screw tap of nut 9 extends in Y direction. Between this screw tap in spindle nut 9 and the two guide elements 7, two identically configured end position cushions 10 are arranged diametrical to the longitudinal axis of spindle nut 9 between spindle 13 and rods 5, as shown in FIG. 4. Cushions 10 are effective in both adjustment directions of the carriage.

Figure 5:
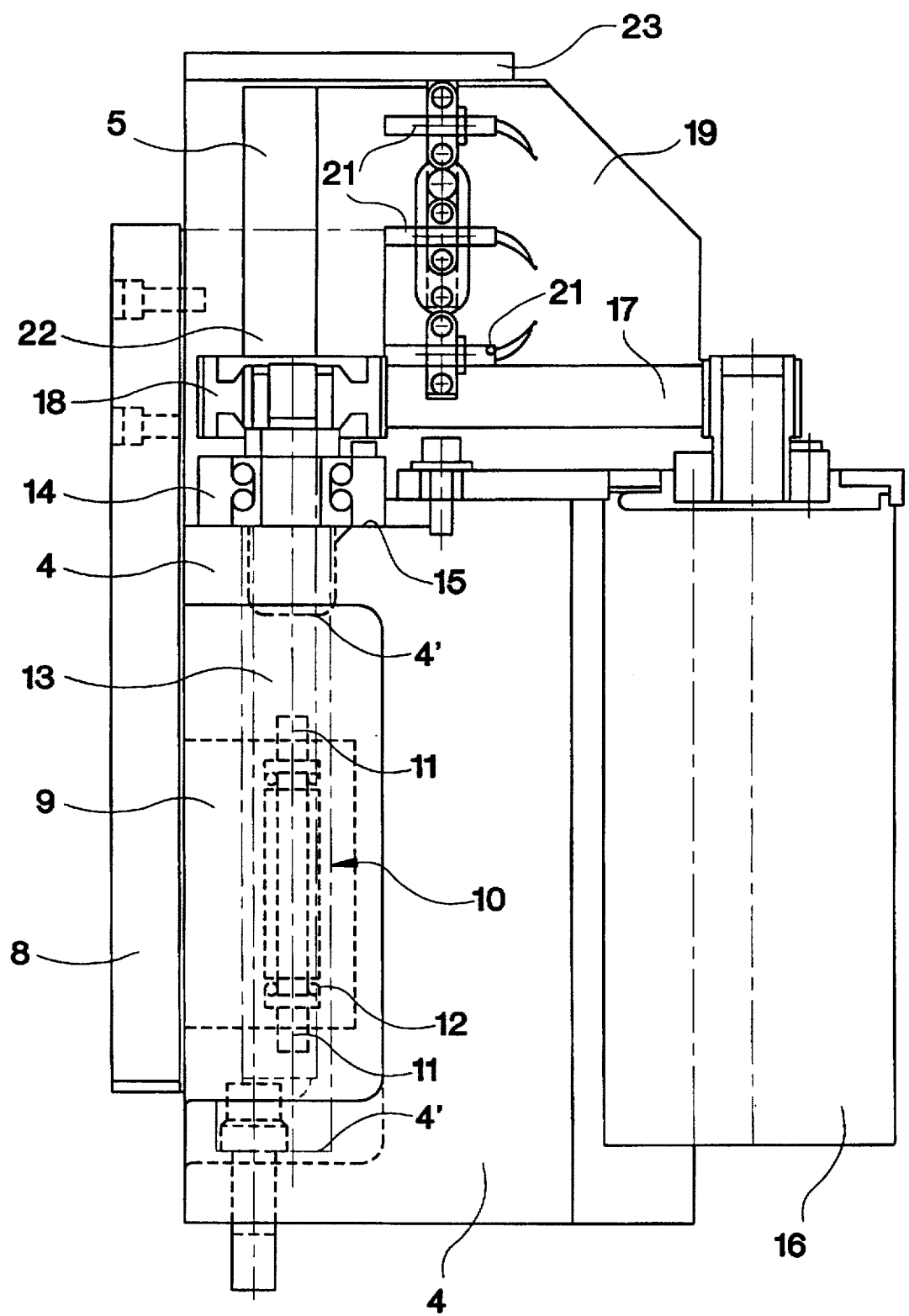
FIG. 5 is a side elevational view of the tool turret of FIG. 1 with the side plate removed.

As shown in FIG. 5, the two end position cushions 10, in either thrust direction of the carriage, have a bolt 11 guided slidably in spindle nut 9. Bolt 11 extends beyond the two sides of spindle nut 9 and is slidable counter to the force of a plate spring assembly 12. The ends of bolt 11 are aligned with top and bottom contact surfaces 4', provided on side walls 4.

Spindle nut 9 is penetrated by a spindle 13 extending in the Y direction. Spindle 13 is mounted rotatably in a roller bearing 14 in the area of its top end segment. The roller bearing is arranged in a mounting plate 15, which is positioned on the top edge of side walls 4 and is screw-connected with these side walls 4.

Mounting plate 15 extends outward beyond the edge of side wall 4 remote from carrier plate 8. A servomotor 16 screwed flange-like onto the mounting plate from below upward at the end of the mounting plate remote from carrier plate 8. The motor shaft extends parallel to spindle 13, and extends upward beyond mounting plate 15. The upper end of the motor shaft supports a drive belt pulley. A toothed endless belt 17 is further guided over the drive belt pulley. Toothed endless belt 17 is guided on its other end over a drive belt pulley 18 arranged securely on upper end of spindle 13 above roller bearing 14.

Each of the two side edges of base plate 1, which extend perpendicular to carrier plate 8, is provided with a reinforcement plate 19 extending in a vertical plane, parallel to side wall 4 and perpendicular to carrier plate 8. Both reinforcement plates are connected securely or fixedly with base plate 1 and sidewall 4. As shown in FIG. 4, one of the two reinforcement plates 19 extends as far as carrier plate 8. As shown in FIGS. 2 and 4, the other reinforcement plate 19 comprises a bottom segment extending outwardly beyond carrier plate 8 and downwardly beyond the bottom of base plate 1. In addition, this bottom segment, which extends beyond the bottom of base plate 1, can be screwed together with support 2, as indicated by the two screws 20 in FIGS. 1 and 2.

As shown in FIG. 5, limit switches 21 are located on one reinforcement plate 19 above mounting plate 15. The limit switches cooperate with a lug 22. Lug 22 is fixed to carrier plate 8, stands apart from the side of carrier plate 8, closer to the carriage guide, and is aligned with limit switches 21 to activate the switches. The unit switches are fixed relative to plate 19 and are immovable.

Figure 3:
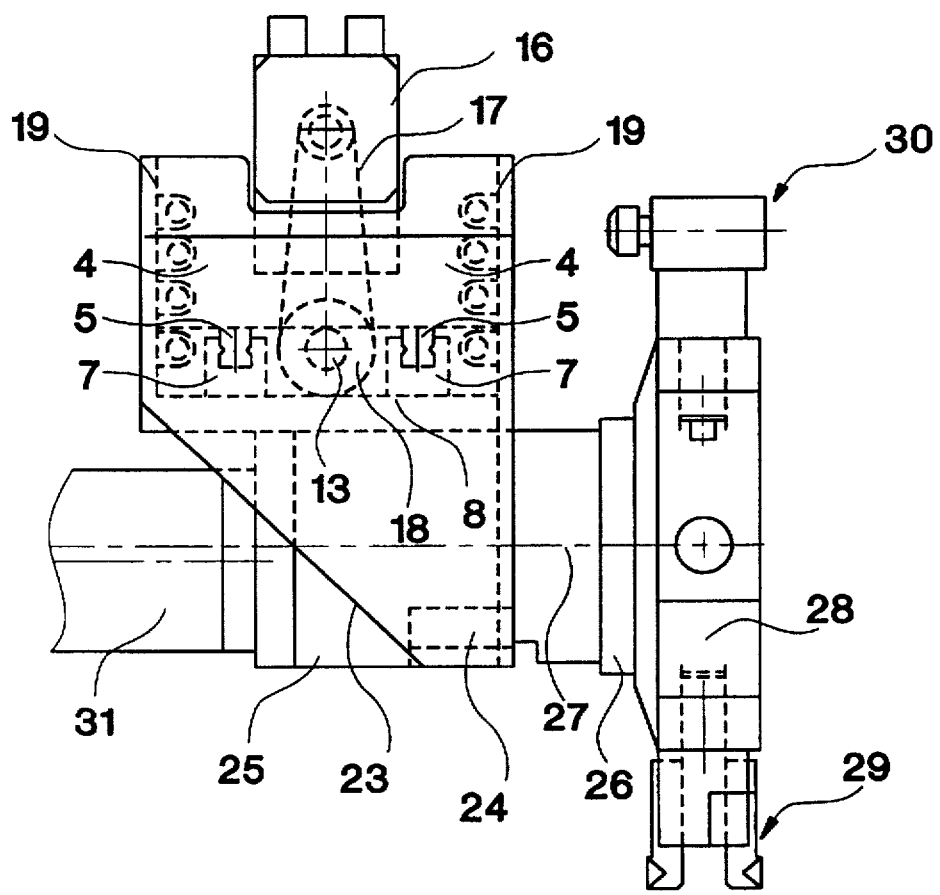
FIG. 3 is a top plan view of the tool turret of FIG. 1.

A cover plate 23 lies in a horizontal plane over both reinforcement plates 19, is screwed together with reinforcement plates 19 and connects the reinforcement plates with one another, as shown particularly in FIG. 3. This cover plate 23 extends some distance above carrier plate 8 on the carrier plate side remote from the carriage guide. The cover plate end, which is remote from carrier plate 8, is connected through a bracket 24 with the segment of one side wall 19 projecting outward and downward beyond base plate 1. Bracket 24 connects cover plate 23 with one reinforcement plate 19. Thus, an additional reinforcement is attained.

In traditional turret housing 25, a turret head 26 is mounted rotatably and can be locked with turret housing 25 in selectable angular settings. A contact surface of the turret housing is directly fastened on and engages on the side of support plate 8 remote from the carriage guide. The turret housing is connected with carrier plate 8 by screws, and is arranged such that rotary axis 27 of turret head 26 extends in the direction of X axis 32. However, the turret head rotary axis could also extend in the direction of the Z axis. The turret head has a tool face 28 with receiving and holding ports for tools, tool holder 29 or spindle heads 30.

Figure 2:
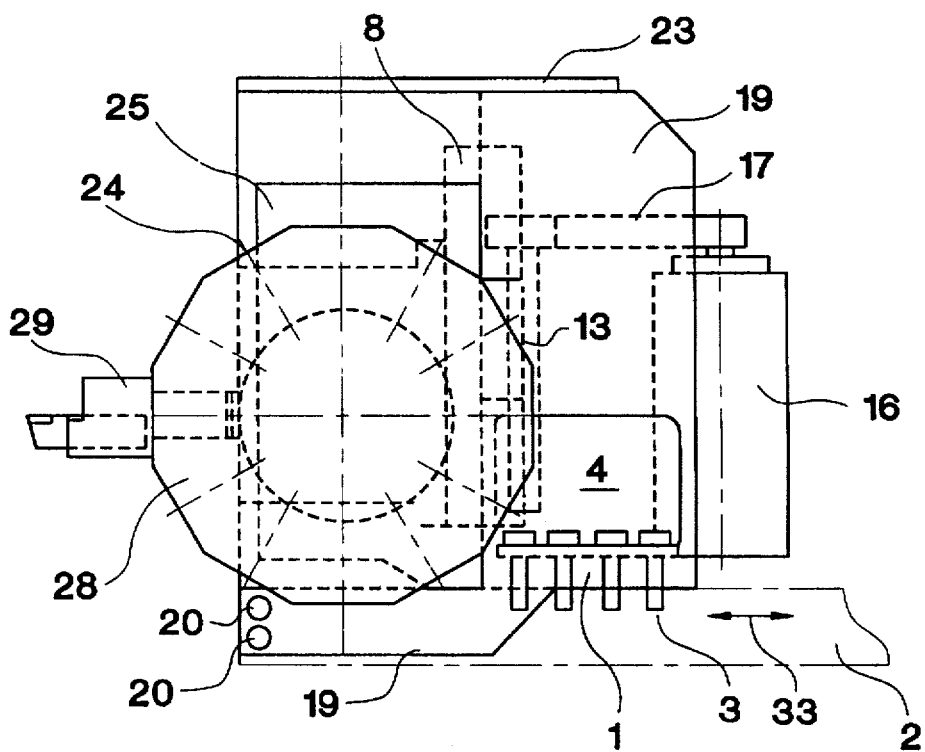
FIG. 2 is an end elevational view of the tool turret of FIG. 1, viewed in the direction of the interface side of the turret head.

As shown particularly in FIGS. 1 and 3, turret housing 25 lies between carrier plate 8 and bracket 24 and projects outwardly beyond one of the two reinforcement plates 19. The turret housing is connected to carrier plate 8 on its side remote from guide element 7. Cover plate 23 covers partly the upper side of the turret housing. The reinforcement plate 19 closer to turret lead 26 has a cut-out through which turret head 25 extends. Reinforcement plate 19 supports turret housing 25 from below, without hindering its thrusting movement in the Y axis. Turret drive motor 31 is mounted on the side of turret housing 25 remote from turret head 26.

If a compensation for an error in the raising of spindle 13 is provided, a sufficient positioning precision of the carriage and, along with the carriage, turret head 26 can be attained. When one or the other end position is reached, lug 22 together with limit switches 21 triggers the disconnection or reverse switching of servomotor 16. The end position cushioning becomes effective after the limit switches have been reached by lug 22. One limit switch 21 serves as reference point switch.

While a particular embodiment has been chosen to illustrate the invention, it will be understood by those skilled in the art that various changes and modifications can be made therein without departing from the scope of the invention as defined in the appended claims.

What is claimed is:

1. A tool turret for machine tools, comprising:

a machine tool support;

a turret housing;

a turret head rotatably mounted in said turret housing about a rotary axis and lockable in selected angular settings relative to said turret housing;

tool means, on said turret head, for attaching tools to said turret head;

a carriage supporting said turret housing and guiding movement of said turret housing relative to said machine tool support in a Y direction transverse to said rotary axis;

a carriage guide on said tool support for guiding movement of said carriage;

carriage adjustment means coupled to said carriage; and a carrier plate, as part of said carriage, extending in a plane defined by said Y direction and one of an X direction and a Z direction, said carrier plate being located between said turret housing and said carriage guide, said rotary axis extending parallel to said carrier plate.

2. A tool turret according to claim 1 wherein said machine tool support comprises a cross slide.

3. A tool turret according to claim 1 wherein said turret housing is fixedly mounted on said carrier plate.

4. A tool turret according to claim 1 wherein said machine tool support comprises a base plate with means for attachment to a machine tool, first and second side walls extending perpendicularly from said base plate, and a mounting plate spaced from said base plate and coupled to said side walls;

said carriage guide is mounted on said side walls and comprises two profiled rods;

said mounting plate is aligned parallel to said base plate, and supports a bearing;

a spindle is supported in said bearing parallel to and between said profiled rods; and an electromotor is coupled to and spaced from said spindle for driving said spindle.

5. A tool turret according to claim 4 wherein
said spindle is fixed against sliding movement in an axial direction thereof adjacent a top end thereof in said bearing.

6. A tool turret according to claim 4 wherein
said electromotor is a servomotor with a motor shaft parallel to said spindle; and
said spindle and said motor shaft are coupled by a toothed, endless belt for driving said spindle.

7. A tool turret according to claim 1 wherein
said carriage guide comprises a prebiased roller guide.

8. A tool turret according to claim 1 wherein
a spindle nut is fixedly mounted on said carrier plate on a side thereof proximate to said carriage guide;
said spindle nut is arranged on a spindle; and
first and second end cushions on ends of said spindle nut for both adjusting directions of said spindle nut.

9. A tool turret according to claim 8 wherein
each of said end cushions comprises at least one plate spring assembly.

10. A tool turret according to claim 9 wherein
said plate spring assemblies are arranged in parallel with said spindle and diametrically to said spindle in said spindle nut, and are mounted on bolts, said bolts being longitudinally slidable relative to said spindle nut.

11. A tool turret according to claim 1 wherein
said machine tool support comprises a base plate and first and second side walls extending from said base plate;
said turret head projects outwardly from and over said first side wall; and
a reinforced plate is arranged parallel to said first side wall, is fixedly connected to said base plate.

12. A tool turret according to claim 11 wherein
one side of said carrier plate is attached to said turret housing;
a cover plate is connected with a top edge of said reinforcement plate, and extends outward relative to said carrier plate on said one side thereof at a distance above said carrier plate; and
a connection part is connected to a part of said reinforcement plate which extends below a lower surface of said turret housing, said cover plate extending over said connection part, said turret housing being between said connection part and said carrier plate.

13. A tool turret according to claim 1 wherein
said carrier plate extends in a plane, said rotary axis extending parallel to said plane.

14. A tool turret for machine tools, comprising:
a machine tool support;
a turret housing;
a turret head rotatably mounted in said turret housing about a rotary axis and lockable in selected angular settings relative to said turret housing;
tool means, on said turret head, for attaching tools to said turret head;
a carriage supporting said turret housing and guiding movement of said turret housing relative to said machine tool support in a Y direction transverse to said rotary axis;
a carriage guide on said tool support for guiding movement of said carriage;
carriage adjustment means coupled to said carriage;
a carrier plate, as part of said carriage, extending in a plane defined by said Y direction and one of an X direction and a Z direction, said carrier plate being located between said turret housing and said carriage guide;
a spindle nut fixedly mounted on said carrier plate on a side thereof proximate to said carriage guide, said spindle nut being arranged on a spindle; and
first and second end cushions on ends of said spindle nut for both adjusting directions of said spindle nut, each of said end cushions including at least one plate spring assembly, said plate spring assemblies being arranged in parallel with said spindle and diametrically to said spindle in said spindle nut, and being mounted on bolts, said bolts being longitudinally slidable relative to said spindle nut.

15. A tool turret according to claim 14 wherein
said machine tool support comprises a cross slide.

16. A tool turret according to claim 14 wherein
said turret housing is fixedly mounted on said carrier plate.

17. A tool turret according to claim 14 wherein
said machine tool support comprises a base plate with means for attachment to a machine tool, first and second side walls extending perpendicularly from said base plate, and a mounting plate spaced from said base plate and coupled to said side walls;
said carriage guide is mounted on said side walls and comprises two profiled rods;
said mounting plate is aligned parallel to said base plate, and supports a bearing;
said spindle is supported in said bearing parallel to and between said profiled rods; and
an electromotor is coupled to and spaced from said spindle for driving said spindle.

18. A tool turret according to claim 17, wherein
said spindle is fixed against sliding movement in an axial direction thereof adjacent a top end thereof in said bearing.

19. A tool turret according to claim 17 wherein
said electromotor is a servomotor with a motor shaft parallel to said spindle; and
said spindle and said motor shaft are coupled by a toothed, endless belt for driving said spindle.

20. A tool turret according to claim 14 wherein
said carriage guide comprises a prebiased roller guide.

21. A tool turret according to claim 14 wherein
said machine tool support comprises a base plate and first and second side walls extending from said base plate;
said turret head projects outwardly from and over said first side wall; and
a reinforced plate is arranged parallel to said first side wall, is fixedly connected to said base plate.

22. A tool turret according to claim 21 wherein
one side of said carrier plate is attached to said turret housing;
a cover plate is connected with a top edge of said reinforcement plate, and extends outward relative to said carrier plate on said one side thereof at a distance above said carrier plate; and
a connection part is connected to a part of said reinforcement plate which extends below a lower surface of said turret housing, said cover plate extending over said connection part, said turret housing being between said connection part and said carrier plate.

* * * * *